United States Patent [19]

Nickel

[11] Patent Number: 4,792,320
[45] Date of Patent: Dec. 20, 1988

[54] COMPOSITE TUBULAR STRUCTURE

[75] Inventor: Herbert W. Nickel, Germantown, Wis.

[73] Assignee: A. O. Smith Corporation, Milwaukee, Wis.

[21] Appl. No.: 75,234

[22] Filed: Jul. 17, 1987

Related U.S. Application Data

[63] Continuation of Ser. No. 777,191, Sep. 18, 1985, abandoned.

[51] Int. Cl.⁴ .............................................. F16C 3/00
[52] U.S. Cl. ...................................... 464/181; 464/183
[58] Field of Search ......................... 138/109, 120, 155; 285/330; 403/341, 359, 364; 464/134, 179, 181, 182, 183

[56] References Cited

U.S. PATENT DOCUMENTS

| | | | |
|---|---|---|---|
| 889,786 | 6/1908 | Keiner | 403/364 X |
| 2,470,631 | 5/1949 | McClellan | 403/359 X |
| 2,890,900 | 6/1959 | Williamson, Jr. et al. | 285/330 X |
| 3,623,753 | 11/1971 | Henry | 403/364 X |
| 4,238,540 | 12/1980 | Yates et al. | 464/181 X |
| 4,248,062 | 2/1981 | McLain et al. | 464/181 |
| 4,279,275 | 7/1981 | Stanwood et al. | 464/181 X |
| 4,341,482 | 7/1982 | Wollensak | 403/364 X |
| 4,358,284 | 11/1982 | Federmann et al. | 464/181 |
| 4,362,521 | 12/1982 | Puck et al. | 464/182 X |
| 4,380,443 | 4/1983 | Federmann et al. | 464/181 |
| 4,421,497 | 12/1983 | Federmann | 464/181 |
| 4,451,245 | 5/1984 | Hornig et al. | 464/181 |

FOREIGN PATENT DOCUMENTS

| | | | |
|---|---|---|---|
| 45724 | 2/1982 | European Pat. Off. | 285/330 |
| 614159 | 12/1960 | Italy | 464/182 |
| 2071272 | 9/1981 | United Kingdom | 464/183 |

Primary Examiner—Daniel P. Stodola
Attorney, Agent, or Firm—Andrus, Sceales, Starke & Sawall

[57] ABSTRACT

A composite tubular structure, such as a drive shaft, composed of a tubular member formed of fiber reinforced resin and having metal yokes secured to the ends of the tubular member. Each yoke includes a cylindrical sleeve portion bonded in lapping relation to the respective end of the tubular member. A plurality of longitudinally extending ribs or bosses are formed on each sleeve portion and are received in slots provided in the respective end of the tubular member. Windings of a fibrous material impregnated with a thermosetting resin can be applied over the joint between the tubular member and each sleeve portion. With this construction the torsional load is transmitted through the ribs and slots rather than through an adhesive bonded interface between the members.

7 Claims, 2 Drawing Sheets

COMPOSITE TUBULAR STRUCTURE

This is a continuation of application Ser. No. 06/777,191, filed Sept. 18, 1985, now abandoned.

BACKGROUND OF THE INVENTION

Traditionally, vehicle drive shafts have been formed of a steel tube having a high flexural modulus with a forged yoke welded to each end of the steel tube. With both the tube and the yokes formed of steel the drive shaft is a relatively heavy structure.

At certain rotational speeds, a drive shaft can become dynamically unstable. The critical speed at which the instability occurs is generally proportional to the flexural modulus of the shaft and its moment of inertia and generally inversely proportional to the weight of the shaft and its length. To maintain an acceptably high critical speed with a tubular steel drive shaft, the drive shaft in many instances is formed of short multiple sections and shaft support bearings are utilized along the length of the drive shaft which act to rotationally support the shaft sections.

Recently there has been considerable activity in the development of composite drive shafts which are composed of a fiber reinforced resin tube or shaft and light weight metal, such as aluminum, yokes. The composite drive shaft achieves a substantial weight reduction as compared to a steel drive shaft and due to the lighter weight, a one piece composite shaft can replace the multi-section steel shafts, with the resultant elimination of the shaft support bearings which are utilized with a multi-section steel shaft.

However, a problem in the production of a composite drive shaft has been the lack of an adequate connection between the fiber reinforced resin tubular member and the yokes. In one approach to providing an adequate connection between the tube or shaft and the yokes, the ends of the tube, which surround the sleeve portion of the yoke, are connected to the sleeve portion by rivets. In another approach, as shown in U.S. Pat. No. 4,279,275, the sleeve portion of the yoke is provided with a plurality of longitudinally extending grooves and the resin impregnated fibrous material, when producing the tubular member, is wound circumferentially over the grooves to provide an improved mechanical connection between the tube and the yokes.

In the U.S. Pat. No. 4,358,284 the sleeve portion of the yoke is provided with circumferential extending grooves or threads and the fibrous material is wound in the grooves to provide an improved attachment, while in U.S. Pat. No. 4,380,443 a plurality of angularly extending pins are employed to interconnect the wound tube with the sleeve portion of the yoke.

U.S. Pat. No. 4,248,062 proposes to increase the bond between the wound tube and the sleeve portion of the yoke by employing a specific winding pattern including longitudinal helical and circumferential windings.

SUMMARY OF THE INVENTION

The invention is directed to a composite tubular structure, such as a drive shaft having an improved attachment between the fiber reinforced resin tubular member or shaft and the metal yokes. In accordance with the invention, the sleeve portion of each yoke is provided with a plurality of longitudinally extending raised ribs or bosses which are received in slots formed in the respective ends of the fiber reinforced resin tubular member. Windings of a fibrous material impregnated with the thermosetting resin can be applied over the joint between the yokes and the tubular member. With this construction the torsional load is transmitted through the ribs and slots rather than through an adhesive bonded interface between the tubular member and the yokes.

In a modified form of the invention, the portion of the yoke sleeve extending between the bases of adjacent ribs is formed with a recess that extends at acute angle to the axis of the yoke. The end portions of the tubular member located between adjacent slots define flexible tongues, and the end of each tongue is bent inwardly and received within one of the recesses in the sleeve portion of the yoke. An adhesive bond is employed to secure the tips of the tongues within the recesses, as well as to bond the contiguous portions of the tubular member to the sleeve of the yoke.

The invention provides an improved mechanical connection between the fiber reinforced resin tubular member or shaft and the yokes in which the torsional load is transmitted through the ribs and slots.

The composite drive shaft of the invention has a substantially reduced weight over a conventional steel drive shaft and reduces operational noise and vibration.

The composite drive shaft of the invention can be used for relatively long drive shafts and eliminates the need for shaft support bearings which are required in multi-section steel drive shafts. Due to the lesser weight, the drive shaft produces less stress on the supporting bearings.

By use of the fiber reinforced resin tubular member along with forged aluminum yokes, the drive shaft is corrosion resistant.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
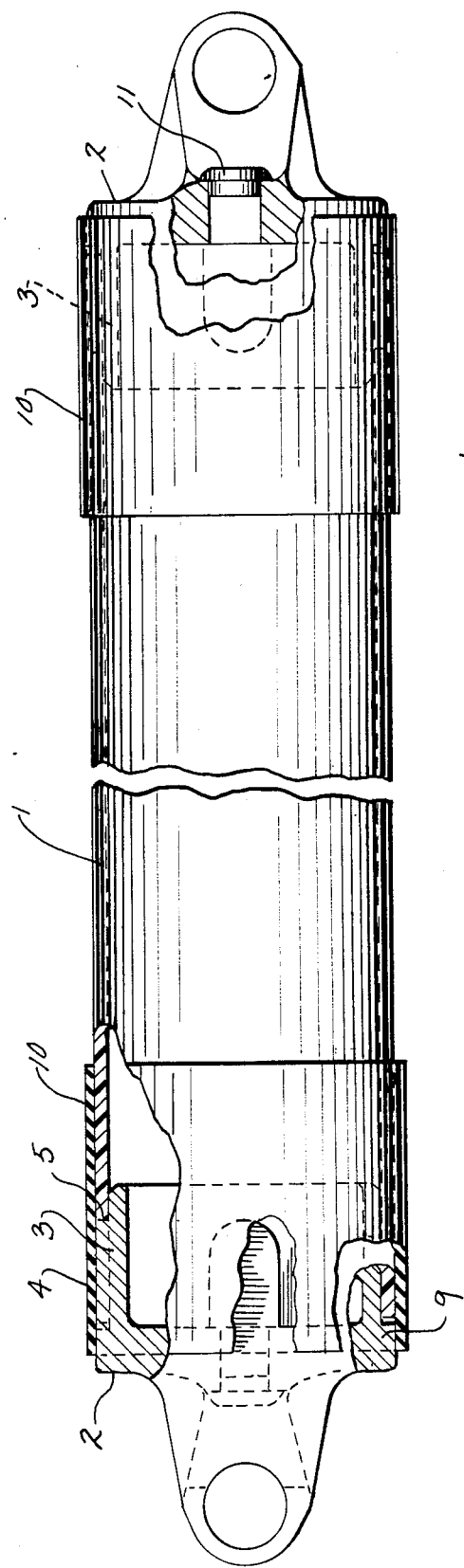
FIG. 1 is a side elevation of the composite drive shaft of the invention with parts broken away in section.

FIG. 1 illustrates a composite drive shaft composed of a fiber reinforced resin shaft or tubular member 1 and a pair of metal yokes 2, formed of aluminum or the like, each of which is connected to an end of the tubular member 1.

Tubular member 1 is formed of a fibrous material such as glass fibers, or a combination of glass and graphite fibers, which are wound in a pattern to provide the desired mechanical properties in the tubular member. A combination of different winding patterns can be used, such as substantially circumferential windings, helical windings and substantially longitudinal windings. The particular winding pattern and fibrous material employed in forming tubular member 1 is conventional and in itself forms no part of the invention.

The fibrous material in tubular member 1 is bonded together by a cured thermosetting resin, such as an epoxy or polyester resin.

Figure 2:
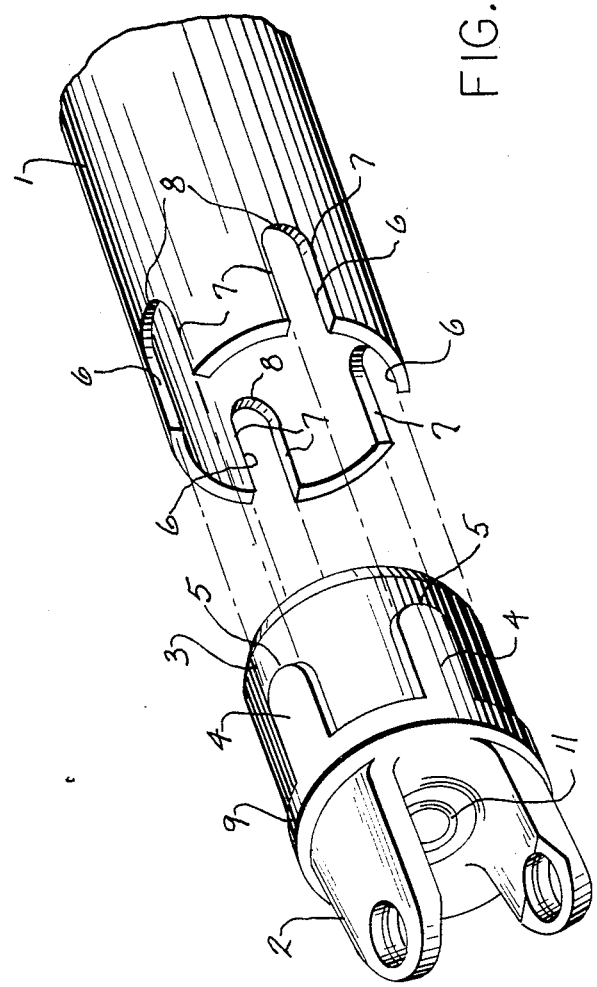
FIG. 2 is an exploded perspective view showing an end of the fiber reinforced resin tubular member and the yoke.

As best illustrated in FIG. 2, each yoke 2 is provided with a generally cylindrical sleeve portion 3 and a plurality of longitudinal raised ribs or bosses 4 are formed on the outer surface of the sleeve 3. As shown, four ribs 4 are utilized, but depending upon the particular application, one or more such ribs can be employed. Each rib is provided with a generally curved or rounded outer end 5 as shown in FIG. 2.

As shown in FIG. 2, the ends of the tubular member 1 are provided with longitudinal slots 6 which receive the ribs 4 on yoke 2. Each slot 6 is bordered by a pair of generally parallel walls 7 and a generally curved or rounded base 8 which engages the rounded end 5 of the respective rib 4. When tubular member 1 is applied over the sleeve 3, the ends 5 of ribs 4 bottom out against the bases 8 of slots 6 so that the end of the tubular member 1 is spaced out of contact with the shoulder 9 on the outer surface of yoke 2.

As an alternate construction, the ribs 4 can be formed on the inner surface of the sleeve 3, and the sleeve inserted over the tubular member 1, so that the ribs are received in slots 6.

The contiguous surfaces of tubular member 1 and yokes 2 are bonded together, preferably by a thermosetting resin or an adhesive system.

To provide additional attachment between tubular member 1 and each yoke 2, a fibrous material impregnated with a thermosetting resin can be wound around the outer surface of tubular member 1 and yoke 2 and across the joint therebetween, as indicated by 10. The outer surfaces of ribs 4 are substantially flush with the outer surface of the tubular member 1 so that the resulting windings 10 will have a smooth outer surface or contour. Alternately, a metal clamping band can be clamped over the joint in place of the fibrous windings 10.

Each yoke 2 is provided with an axial bore which is normally enclosed by a plug 11. During the application of the windings 10, the composite structure, including tubular member 1 and yokes 2, can be supported by a central shaft that extends through the axial openings in yokes 2. The shaft serves to properly align the two yokes 2 and tubular member 1 during winding of the layer 10. After the windings have been applied, the shaft is removed from the composite structure and the axial bores are closed by the plugs 11.

Figure 3:
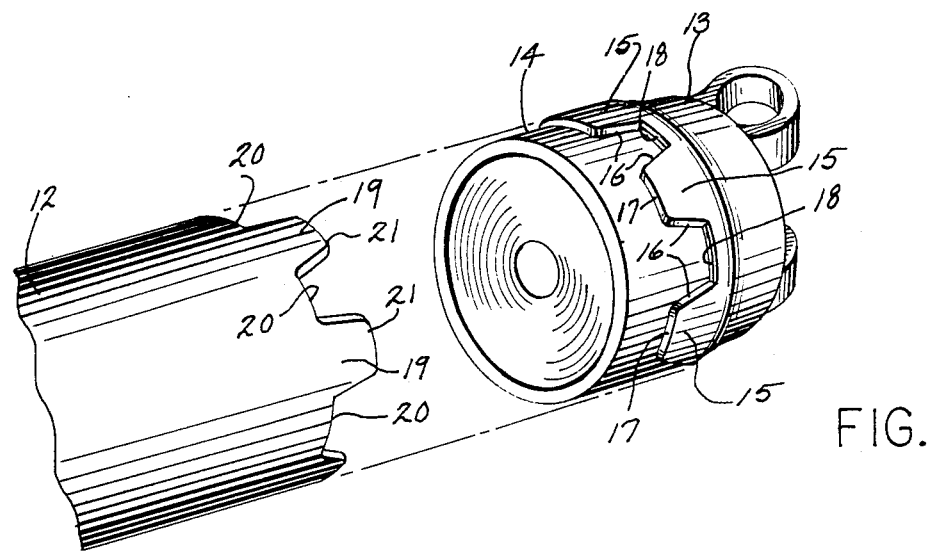
FIG. 3 is an exploded perspective view of a modified form of the invention showing the ends of the tubular member and the yoke.
Figure 4:
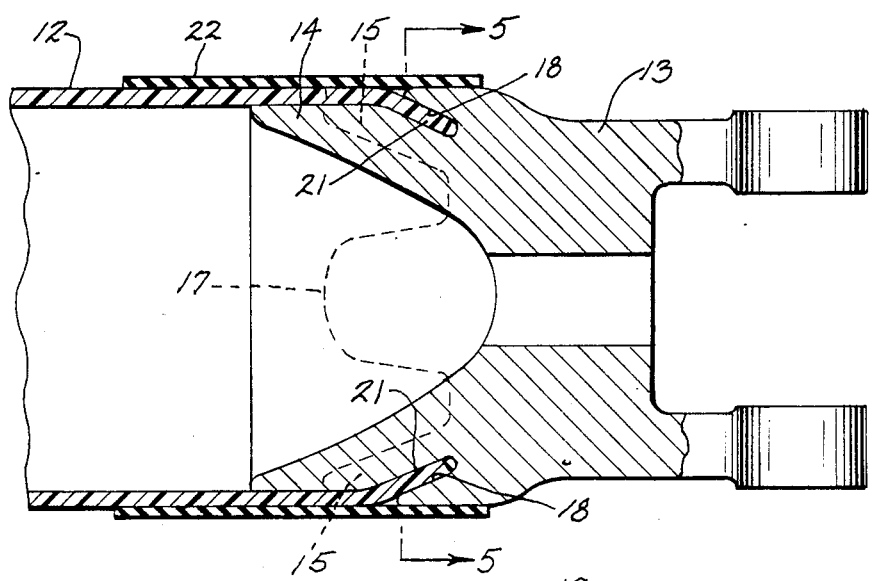
FIG. 4 is a longitudinal section of the connected members as illustrated in FIG. 3.
Figure 5:
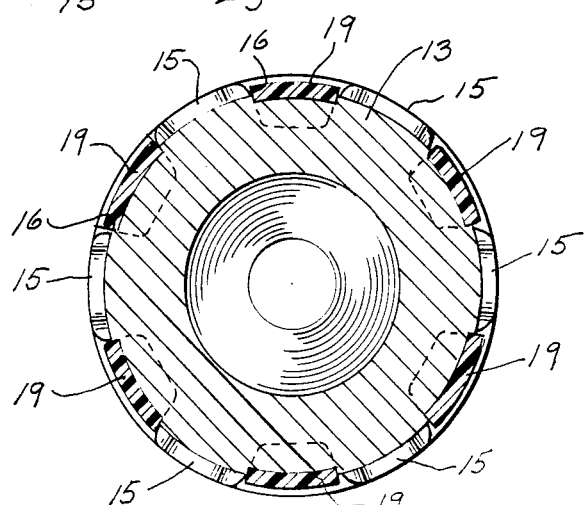
FIG. 5 is a transverse section taken along line 5—5 of FIG. 4.

FIGS. 3-5 illustrate a modified form of the invention in which the composite drive shaft includes a fiber reinforced resin shaft or tubular member 12 and a pair of metal yokes 13. The cylindrical sleeve portion 14 of each yoke 13 is formed with a plurality of longitudinally extending raised ribs or bosses 15. As illustrated in FIG. 5, sleeve portion 14 includes six ribs 15 but it is contemplated that any number of ribs can be utilized.

Each rib 15 is bordered by a pair of angularly extending sides 16 which are connected together by a generally square end 17. As best illustrated in FIG. 4, the portions of sleeve 14 extending between the bases of adjacent ribs 15 are formed with recesses 18 which extend at an acute angle of about 10° to 20° with respect to the axis of sleeve 14.

As best shown in FIG. 3 each end of tubular member 12 is provided with a plurality of tongues 19 which border slots 20. Tongues 19 taper or converge inwardly, as illustrated in FIG. 3, and are received in the spaces between ribs 15 on sleeve 14. The tongues 19 are relatively flexible and the tips 21 of the tongues are bent or deformed inwardly and are received within the angular recesses 18 in sleeve 14. In this construction, the bases of slots 20 bottom out against the ends 17 of ribs 15 and the contiguous surfaces of the tubular member 12 and sleeve 14 are bonded together by an adhesive such as a thermosetting resin. Bonding of the bent ends 21 of tongues 19 within recesses 18 serves to enhance the connection between the tubular member 12 and yokes 13.

As in the case of the first embodiment, windings 22 of a fibrous material impregnated with a thermosetting resin can be applied over the outer surface of the tubular member 12 and yokes 13 to bridge the joint between the members.

The invention provides an improved mechanical interlock between the fiber reinforced resin tubular member or shaft and the metal yokes in which the torsional load is transmitted between the ribs and slots rather than through an adhesive bonded interface between the members.

The composite drive shaft has a substantially reduced weight over a conventional steel drive shaft and provides reduced operational noise in service.

While the above description has illustrated the invention as applied to a composite drive shaft, it is contemplated that the composite tubular member can be used in other load transmitting applications.

Various modes of carrying out the invention are contemplated as being within the scope of the following claims particularly pointing out and distinctly claiming the subject matter which is regarded as the invention:

I claim:

1. A composite tubular structure, comprising a fiber reinforced resin tubular member having a uniform internal diameter, a yoke secured to an end of the tubular member and including a sleeve disposed in lapping relation with an end of said tubular member, a plurality of longitudinal circumferentially spaced ribs on said sleeve, said ribs projecting radially outward from said sleeve, said end of said tubular member having a plurality of longitudinal circumferentially spaced slots to receive the corresponding ribs and having a tongue disposed between each pair of adjacent slots, said slots opening at said end of the tubular member and extending completely through the wall of said tubular member, said ribs having a radial depth substantially equal to the thickness of said tubular member, said tongues being in contiguous overlapping relation with said sleeve, bonding means for adhesively bonding said end of the tubular member to said sleeve, and clamping means disposed on the outer surface of said tubular member and said sleeve and extending across the joint therebetween.

2. The structure of claim 1, wherein each slot is a provided with a generally rounded base and each rib is formed with a rounded end to mate with said base.

3. The structure of claim 1, wherein said sleeve is formed with a recess between each adjacent pair of ribs, said recess extending at an acute angle to the axis of said sleeve, the outer end of each tongue being bent inwardly at an acute angle to the axis of the tubular member and disposed within a corresponding recess in the sleeve, said adhesive bonding means serving to bond the outer ends of said tongues within said recesses.

4. The structure of claim 1, wherein each rib is bordered by a pair of generally parallel sides and each rib has a rounded outer end, each slot having a rounded base disposed in engagement with said rounded end of the corresponding rib.

5. A composite tubular structure, comprising a fiber reinforced resin tubular member, a yoke secured to an end of the tubular member and including a sleeve disposed in lapping relation with an end of said tubular member, a plurality of longitudinal circumferentially spaced ribs on said sleeve, said ribs projecting radially outward from said sleeve, said end of said tubular member having a plurality of longitudinal circumferentially spaced slots to receive the corresponding ribs and having tongue disposed between each pair of adjacent slots, said slots opening at said end of the tubular member and extending completely through the wall of said tubular member, said tongues being in contiguous overlapping relation with said sleeve, and clamping means disposed on the outer surface of said tubular member and said sleeve and extending across the joint therebetween.

6. The structure of claim 5, wherein said ribs have a shorter axial length than said sleeve to provide a sleeve portion extending between the inner end of each rib and the inner end of said sleeve, said tubular member being in contiguous overlapping relation with said sleeve portions.

7. A composite tubular structure, comprising a fiber reinforced resin tubular member, a yoke secured to an end of the tubular member an including a sleeve disposed in lapping relation with an end of said tubular member, a plurality of longitudinal circumferentially spaced ribs on said sleeve, said ribs projecting radially outward from said sleeve, said end of said tubular member having a plurality of longitudinal circumferentially spaced slots to receive the corresponding ribs and having a tongue disposed between each pair of adjacent slots, said slots opening at said end of the tubular member and extending completely through the wall of said tubular member, said sleeve having a recess between each adjacent pair of ribs, each recess extending at an acute angle to the axis of said sleeve, said tongues being in contiguous overlapping relation with said sleeve and the outer end of each tongue being bent inwardly at an acute angle to the axis of said sleeve and disposed within a corresponding recess in said sleeve, and clamping means disposed on the outer surface of said tubular member and said sleeve and extending across the joint therebetween.

* * * * *

UNITED STATES PATENT AND TRADEMARK OFFICE
CERTIFICATE OF CORRECTION

PATENT NO. : 4,792,320

DATED : December 20, 1988

INVENTOR(S) : Herbert W. Nickel

It is certified that error appears in the above-identified patent and that said Letters Patent is hereby corrected as shown below:

Column 5, line 17, after "ing" insert -- a --; Column 6, line 6, delete "an" and substitute therefor --and--.

Signed and Sealed this

Second Day of January, 1990

Attest:

JEFFREY M. SAMUELS

*Attesting Officer*     *Acting Commissioner of Patents and Trademarks*